United States Patent
Mohr et al.

(10) Patent No.: US 10,848,298 B1
(45) Date of Patent: Nov. 24, 2020

(54) METHOD AND APPARATUS FOR A SELECTIVE PULSE AMPLITUDE MODULATION SIGNAL PHASE DETECTOR

(71) Applicant: Mellanox Technologies, Ltd., Yokneam (IL)

(72) Inventors: Johan Jacob Mohr, Copenhagen (DK); Thorkild Franck, Roskilde (DK); Eyal David, Atzmon (IL)

(73) Assignee: Mellanox Technologies Denmark ApS., Roskilde (DK)

( * ) Notice: Subject to any disclaimer, the term of this patent is extended or adjusted under 35 U.S.C. 154(b) by 0 days.

(21) Appl. No.: 16/653,005

(22) Filed: Oct. 15, 2019

(51) Int. Cl.
| | | |
|---|---|---|
| H04L 7/033 | (2006.01) | |
| H04L 27/38 | (2006.01) | |
| H04L 7/027 | (2006.01) | |
| H04L 25/02 | (2006.01) | |

(52) U.S. Cl.
CPC .............. *H04L 7/033* (2013.01); *H04L 7/027* (2013.01); *H04L 27/38* (2013.01); *H04L 25/0276* (2013.01)

(58) Field of Classification Search
CPC . H04L 7/0062; H04L 7/033; H04L 25/03006; H04L 25/069; H04L 27/38; H04L 25/0292; H04L 7/027; H04L 25/0276
See application file for complete search history.

(56) References Cited

U.S. PATENT DOCUMENTS

2018/0302264 A1* 10/2018 Liao .................. H04L 27/06

* cited by examiner

*Primary Examiner* — Rahel Guarino
(74) *Attorney, Agent, or Firm* — Alston & Bird LLP

(57) ABSTRACT

Embodiments are disclosed for full-rate phase detection for a pulse amplitude modulation N (PAM-N) signal. The example method includes sampling an incoming signal in one or more sampling times. The example method further includes determining that an amplitude associated with a current sampling time is within an upper threshold and a lower threshold for each sampling time of the one or more sampling times. The example method further includes upon determining that the amplitude of the current sampling time is within the upper threshold and the lower threshold, determining an amplitude range associated with an immediately preceding sampling time and an amplitude range associated with an immediately subsequent sampling time. The example method further includes determining a transition status representing one of an upward transition, a downward transition, or no transition with respect to the current sampling time.

20 Claims, 3 Drawing Sheets

METHOD AND APPARATUS FOR A SELECTIVE PULSE AMPLITUDE MODULATION SIGNAL PHASE DETECTOR

BACKGROUND

Embodiments of the present invention relate generally to phase detection. More specifically, embodiments of the present invention relate to a phase detector in the context of signal processing, for example, in setting the phase of a data sampler in a pulse amplitude modulation-N (PAM-N) receiver.

BRIEF SUMMARY

Example embodiments described herein disclose a method and an apparatus for phase detection. The details of some embodiments of the subject matter described in this specification are set forth in the accompanying drawings and the description below. Other features, aspects, and advantages of the subject matter will become apparent from the description, the drawings, and the claims.

In accordance with an example embodiment, a full-rate phase detector for a pulse amplitude modulation N (PAM-N) signal is provided. The phase detector is configured to receive an incoming signal encoding one or more symbols in N amplitude values. The phase detector is further configured to sample the incoming signal in one or more sampling times. For each sampling time of the one or more sampling times, the phase detector is further configured to determine that an amplitude associated with a current sampling time is within an upper threshold and a lower threshold. The phase detector is configured to determine an amplitude range associated with an immediately preceding sampling time and an amplitude range associated with an immediately subsequent sampling time upon determining that the amplitude of the current sampling time is within the upper threshold and the lower threshold. The phase detector is further configured to determine a transition status representing one of an upward transition, a downward transition, or no transition with respect to the current sampling time based on the amplitude range of the immediately preceding sampling time and the amplitude range of the immediately subsequent sampling time. In some embodiments, the phase detector is configured to update a sampling phase based on the transition status.

In some embodiments, the value of N is equal to or greater than 3. In some embodiments, the phase detector determines that the amplitude range associated with the current sampling time is within the upper threshold and the lower threshold by using a first slicer associated with the upper threshold and a second slicer associated with the lower threshold. The first slicer and the second slicer are embedded within the phase detector.

In some embodiments, the transition status is determined to be the upward transition in an instance in which the amplitude range of the immediately preceding sampling time is smaller than a pre-defined low threshold and the amplitude range of the immediately subsequent sampling time is larger than a pre-defined high threshold. The transition status is determined to be the downward transition in an instance in which the amplitude range of the immediately subsequent sampling time is smaller than the pre-defined low threshold and the amplitude range of the immediately preceding sampling time is larger than the pre-defined high threshold.

In some embodiments, amplitude range associated with the immediately preceding sampling time and the amplitude range associated with the immediately subsequent sampling time are determined by using a third slicer and a fourth slicer embedded within the phase detector. In some embodiments, the third slicer is associated with the pre-defined low threshold and the fourth slicer is associated with the pre-defined high threshold.

In some embodiments, the transition status is determined to be the no transition in an instance in which the transition status is not the upward transition or the downward transition.

In some embodiments, the phase detector is configured to update the sampling phase by incrementing the sampling phase by a step defined by a pre-defined number of unit intervals in an instance in which the transition status is upward transition, by decrementing the sampling phase by the step defined by the pre-defined number of unit intervals in an instance in which the transition status is downward transition, and by making no adjustment in an instance in which the transition status is the no transition.

In some embodiments, one or more amplitude values associated with each of the pre-defined high threshold, the pre-defined low threshold, the upper threshold, and the lower threshold is associated with a symbol value.

In some embodiments, the value of N is 4, the amplitude value associated with the pre-defined low threshold is associated with a symbol value of one of 0, 1, or 2, the amplitude value associated with the lower threshold is associated with a symbol value of one of 0, 1, or 2, the amplitude value associated with the pre-defined high threshold is associated with a symbol value of one of 1, 2, or 3, and the amplitude value associated with the upper threshold is associated with a symbol value of one of 1, 2, or 3.

In some embodiments, the phase detector configured to determine, in an instance in which the transition status is not the no transition, whether a phase detection associated with the current sampling time is early or late by using a fifth slicer to determine whether the amplitude associated with the current sampling time is larger than a threshold $T_0$.

In another embodiment, a method for phase detection for a full-rate phase detector for a pulse amplitude modulation N (PAM-N) signal is provided. The method includes receiving an incoming signal encoding one or more symbols in N amplitude values. The method further includes sampling the incoming signal in one or more sampling times.

The method further includes determining that an amplitude associated with a current sampling time is within an upper threshold and a lower threshold for each sampling time of the one or more sampling times.

The method further includes upon determining that the amplitude of the current sampling time is within the upper threshold and the lower threshold, determining an amplitude range associated with an immediately preceding sampling time and an amplitude range associated with an immediately subsequent.

The method further includes determining a transition status representing one of an upward transition, a downward transition, or no transition with respect to the current sampling time based on the amplitude range of the immediately preceding sampling time and the amplitude range of the immediately subsequent sampling time.

The method further includes updating a sampling phase based on the transition status.

In some embodiments, the value of N is equal to or greater than 3. In some embodiments, the determining that the amplitude range associated with the current sampling time is within the upper threshold and the lower threshold comprises using a first slicer associated with the upper threshold and a second slicer associated with the lower threshold. The first slicer and the second slicer are embedded within the phase detector.

In some embodiments, the transition status is determined to be the upward transition in an instance in which the amplitude range of the immediately preceding sampling time is smaller than a pre-defined low threshold and the amplitude range of the immediately subsequent sampling time is larger than a pre-defined high threshold. In some embodiments, the transition status is determined to be the downward transition in an instance in which the amplitude range of the immediately subsequent sampling time is smaller than the pre-defined low threshold and the amplitude range of the immediately preceding sampling time is larger than the pre-defined high threshold.

In some embodiments, amplitude range associated with the immediately preceding sampling time and the amplitude range associated with the immediately subsequent sampling time are determined by using a third slicer and a fourth slicer embedded within the phase detector. In some embodiments, the third slicer is associated with the pre-defined low threshold and the fourth slicer is associated with the pre-defined high threshold.

In some embodiments, the transition status is determined to be the no transition in an instance in which the transition status is not the upward transition or the downward transition.

In some embodiments, updating the sampling phase comprises incrementing the sampling phase by a step defined by a pre-defined number of unit intervals in an instance in which the transition status is upward transition, decrementing the sampling phase by the step defined by the pre-defined number of unit intervals in an instance in which the transition status is downward transition, and making no adjustment in an instance in which the transition status is the no transition.

In some embodiments, one or more amplitude values associated with each of the pre-defined high threshold, the pre-defined low threshold, the upper threshold, and the lower threshold is associated with a symbol value.

In some embodiments, the value of N is 4, the amplitude value associated with the pre-defined low threshold is associated with a symbol value of one of 0, 1, or 2, the amplitude value associated with the lower threshold is associated with a symbol value of one of 0, 1, or 2, the amplitude value associated with the pre-defined high threshold is associated with a symbol value of one of 1, 2, or 3, and the amplitude value associated with the upper threshold is associated with a symbol value of one of 1, 2, or 3.

In some embodiments, the method further comprises determining, in an instance in which the transition status is not the no transition, whether a phase detection associated with the current sampling time is early or late by using a fifth slicer to determine whether the amplitude associated with the current sampling time is larger than a threshold $T_0$.

BRIEF DESCRIPTION OF THE DRAWINGS

Figure 1:
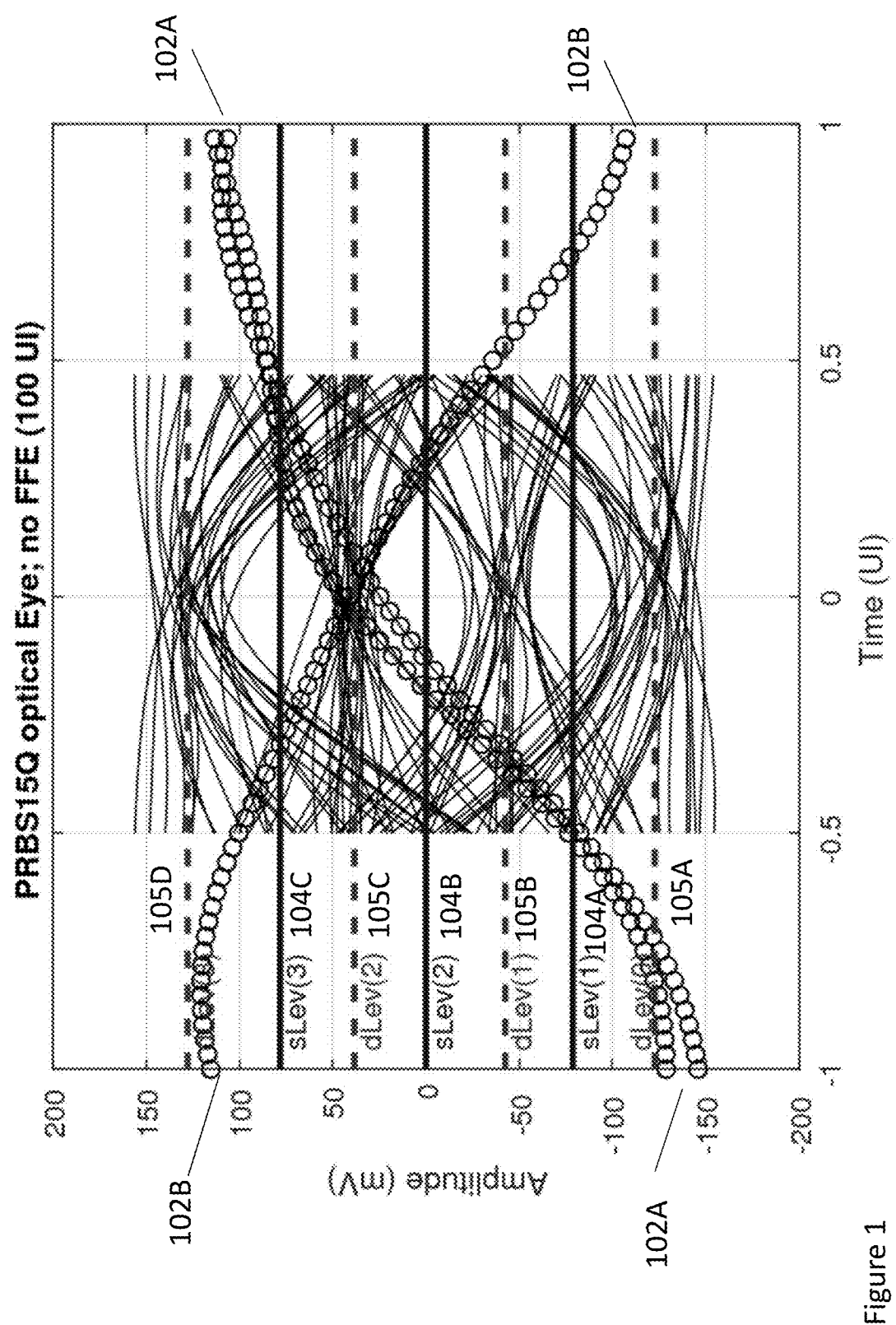
Figure 2:
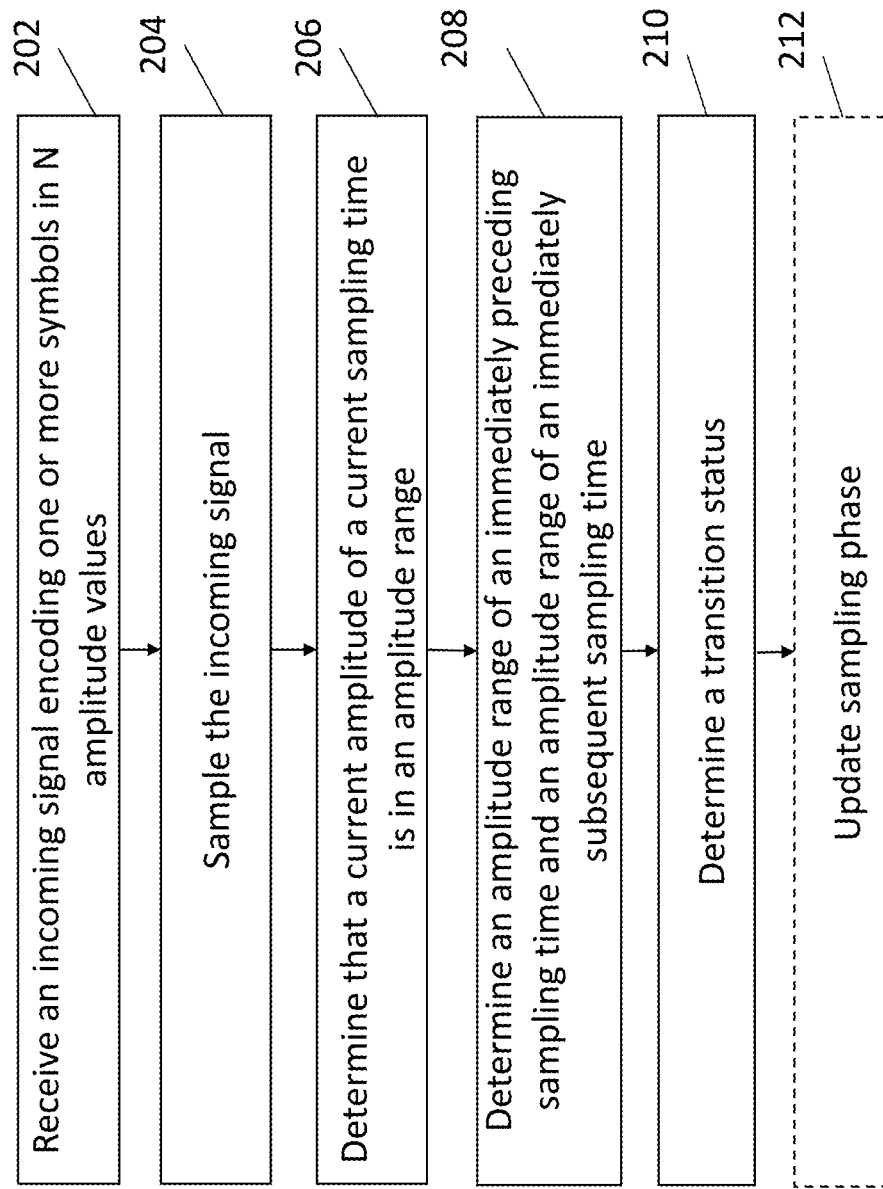
Figure 3:
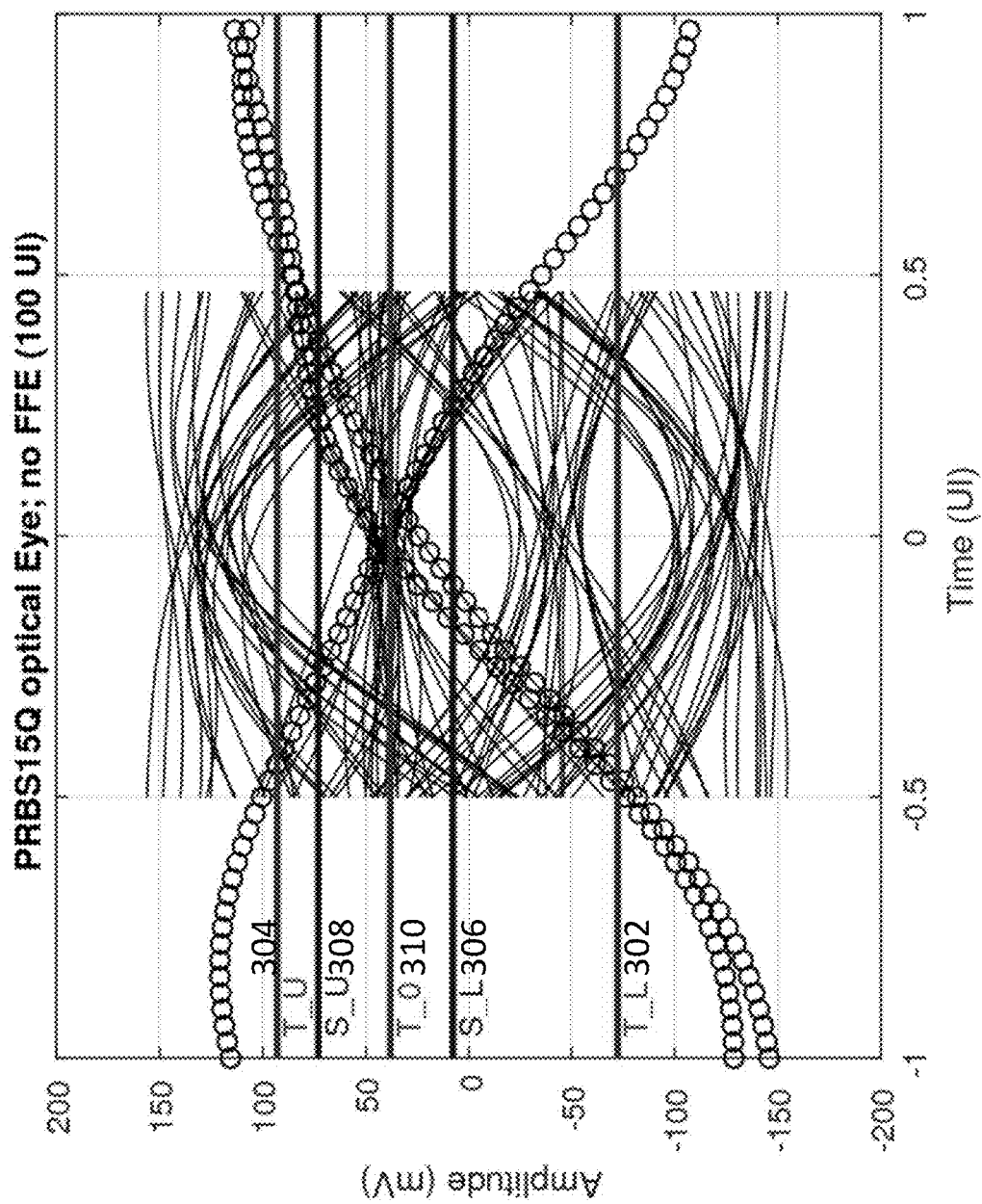

Having thus described the invention in general terms, reference will now be made to the accompanying drawings, which are not necessarily drawn to scale, and wherein:

FIG. 1 illustrates a waveform being processed by example embodiments of the invention;

FIG. 2 is a flowchart illustrating an example method of operation of a phase detector embedded in a receiver according to example embodiments of the invention; and FIG. 3 illustrates a waveform being processed by example embodiments of the invention.

DETAILED DESCRIPTION OF THE INVENTION

Example embodiments will now be described more fully hereinafter with reference to the accompanying drawings, in which some, but not all, embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The term "exemplary," as may be used herein, is not provided to convey any qualitative assessment, but instead merely to convey an illustration of an example. Thus, use of any such terms should not be taken to limit the spirit and scope of embodiments of the present invention.

Electrical/optical communication systems generally include a transmitter, a receiver, and a channel. The transmitter generates a signal conveying information, which, after being transmitted over a channel, is received and recovered at the receiver. The signal conveying information can be encoded in various ways such as PAM, quadrature amplitude modulation, or the like. The signal being transmitted by the transmitter is a series of symbols with different amplitudes representing data in a defined timing.

In the real world, transmission channels are non-ideal and introduce various unwanted effects that cause distortion of the signals, making the communication less reliable. For example, the channel may have a transfer function that introduces changes in the signal transmitted in the form of amplitude and/or phase changes. These changes distort the signal received at the receiver. For example, during transmission, inter-symbol interference ("ISI") may occur. ISI is a form of distortion of a signal in which one symbol interferes with subsequent symbols. The presence of ISI makes the communication less reliable. The channel may distort the signal in many ways such as addition of noise, cross-talk, and non-linear effects, and all of these unwanted effects may distort the signal in the transmission process. Therefore, accurate recovery of information at the receiver of the communication system is a challenging issue.

For a PAM-N optical/electrical communication system, the phase of the decision point, i.e., the point at which an incoming digital signal is sampled, needs to be set accurately to accurately recover the information conveyed in the original signal. Accurately setting the phase is particularly important for PAM-N systems with N>2 and a limited bandwidth. In such systems, eye openings of eye diagrams are inherently much narrower in the time-dimension compared to traditional non-return-to-zero (NRZ) (N=2) communication systems. A clock-recovery system at the receiver may be used to recover the timing information in the received signal and a separate (or non-separate) data recovery system may utilize the timing information as a reference clock to sample the incoming data signal to generate a bitstream to recover information conveyed in the transmitted signal.

A baud-rate PAM-N receiver only provides one sampling during one symbol unit interval (UI). To set the optimal sampling phase, one could make use of eye-sweeps and bath-tub curves. However, to sweep the eye, one would need to change the decision phase and thus potentially increase the bit-error rate. A more efficient (e.g., faster) and more robust alternative is to use a phase detector (PD) and integrate its output into a phase-error; or in approximative methods to sum the sign of detected phase-errors to achieve the sign of the phase-error. For example, for NRZ (PAM-2) signals, the Mueller-Müller baud-rate PD which may require gain calibration may be utilized.

Example embodiments of the present invention provide a full-rate selective phase detector. One usage of such example embodiments is providing robust means for setting the phase of the data sampler in a receiver of an optical/electrical communication system when the clock-recovery (CR) system, which has a separate phase detector, is in lock. In some embodiments, in a system where an Alexander (Bang-Bang) phase detector is used in the clock-recovery system to recover the clock, the clock-recovery aligns to the transitions whereas the data-sampler(s) need to be shifted approximately 0.5 unit intervals (UIs) relative to the transition-samplers in order to provide reasonably reliable symbol decisions for the phase detector logic. Therefore, the data-sampler can be shared between the CR system and the data-recovery system. In some embodiments, the data sampler is used as a phase detector in the CR system.

Example embodiments of the full-rate selective phase detector operate when a current symbol(n) is in an amplitude range defined by two thresholds [$S_L$; $S_U$]. Given that the current symbol(n) is in the amplitude range, symbol(n−1) and symbol(n+1) may be used to determine whether there is an upward-transition, a downward-transition, or no-transition based on two thresholds {$T_L$; $T_U$}. Subsequently, the sign of the current symbol, relative to the threshold $T_0$, defines the phase detection decision which is either early or late, provided that the symbol is selected and there is a transition.

FIG. 1 illustrates a PRBS15Q waveform without feedforward equalization (FFE) that is being processed by example embodiments of the phase detector. The symbol alphabet is {0,1,2,3}. 100 unit intervals (UI) of the waveform are shown. Upward transitions illustrated in the dotted traces 102A and downward transitions illustrated in the dotted traces 102B are shown. Three horizontal lines, 104A-104C, illustrate three sLev (1-3) that represent three different slicer levels used for slicing (sampling) the optical signal. Four horizontal lines, 105A-105D, illustrate four dLev(0-3) that represent different slicer levels aligned to the average data levels.

FIG. 2 is a flowchart illustrating an example method of operation of a phase detector embedded in a receiver according to example embodiments of the present invention. It will be understood that each block of the flowcharts, and combinations of blocks in the flowcharts, may be implemented by various means. In some example embodiments, certain ones of the operations herein may be modified or further amplified as described below. Moreover, in some embodiments additional optional operations may also be included. It should be appreciated that each of the modifications, optional additions, or amplifications described herein may be included with the operations herein either alone or in combination with any others among the features described herein. In some embodiments, the phase detector is a full-rate phase detector that uses sampled amplitude data and one or more virtual slicers where data are first sampled by an analog to digital converter and then processed digitally. In some embodiments, the phase detector is non-linear and utilizes slicers to sample an incoming signal.

In some embodiments, at operation 202, the phase detector is configured to receive, via the receiver, an incoming signal encoding one or more symbols in N amplitude values. In some embodiments, the incoming signal is a pulse amplitude modulation-N (PAM-N) signal with the value of N equal to or bigger than 3. In some embodiments, the receiver receives an optical signal encoding symbols in a plurality of eyes (such as 3 eyes for PAM-4).

In some embodiments, at operation 204, the phase detector is configured to sample the incoming signal in one or more sampling times. In some embodiments, the phase detector may sample the incoming signal by utilizing a sampling circuitry that comprises one or more slicers. In some embodiments, the incoming signal is a signal with one or more eyes without feedforward equalization being applied.

For each sampling time of the one or more sampling times, in some embodiments, at operation 206, the phase detector is configured to determine if an amplitude value of a current sampling time, s(n), is in an amplitude range defined by an upper threshold and a lower threshold, {$S_L$, $S_U$}. FIG. 3 illustrates an example waveform in accordance with some embodiments. Horizontal lines 306 and 308 in FIG. 3 illustrate example upper threshold and lower threshold {$S_L$, $S_U$}. In some embodiments, the amplitude range may correspond to an amplitude range that corresponds to one symbol. In some embodiments, the amplitude range may correspond to an amplitude range that corresponds to more than one symbol. In some embodiments, the amplitude range may correspond to an amplitude range that does not align with an amplitude range that corresponds to one or more symbols. If the amplitude value of a current sampling time, s(n), is not in the amplitude range defined by an upper threshold and a lower threshold, {$S_L$, $S_U$}, the current sampling time may be skipped by the phase detector and the rest of the operations may be skipped for the current sampling time.

In some embodiments, the phase detector uses a first slicer associated with the upper threshold and a second slicer associated with the lower threshold to determine if the amplitude value is within the amplitude range. In some embodiments, the first slicer is a slicer circuit (also known as a clipping circuit) that is configured to sample the waveform to determine whether an amplitude at a sampling time is larger than the upper threshold or not. Similarly, in some embodiments, the second slicer is a slicer circuit that is configured to sample the waveform to determine whether an amplitude at a sampling time is smaller than the lower threshold or not.

In some embodiments, upon determining that the amplitude value is in the amplitude range defined by the upper threshold $S_U$ and the lower threshold $S_L$, at operation 208, the phase detector is configured to determine an amplitude range of an immediately preceding sampling time (from the one or more sampling times) of the current sampling time, s(n−1), and an amplitude range of an immediately subsequent sampling time (from the one or more sampling times) of the current sampling time, s(n+1). The phase detector may determine the amplitude ranges by identifying amplitude ranges sampled by one or more slicers in operation 204.

In some embodiments, at operation 210, the phase detector is configured to determine a transition status representing one of an upward transition, a downward transition, or no transition with respect to the current sampling time based on the amplitude range of the immediately preceding sampling time of the current sampling time and the amplitude range of the immediately subsequent sampling time of the current sampling time.

In some embodiments, the transition status is determined to be the upward transition in an instance in which the amplitude range of the immediately preceding sampling time is smaller than a pre-defined low threshold $T_L$ and the amplitude range of the immediately subsequent sampling time is larger than a pre-defined high threshold $T_U$, and the transition status is determined to be the downward transition in an instance in which the amplitude range of the immediately subsequent sampling time is smaller than the pre-defined low threshold $T_L$ and the amplitude range of the immediately preceding sampling time is larger than the pre-defined high threshold $T_U$. By way of example, horizontal lines 302 and 304 as illustrated in FIG. 3 illustrate the pre-defined low threshold $T_L$ and the pre-defined high threshold $T_U$.

In some embodiments, the amplitude range associated with the immediately preceding sampling time and the amplitude range associated with the immediately subsequent sampling time are determined by using a third slicer and a fourth slicer embedded within the phase detector. Similar to the structure of the first and the second slicer, in some embodiments, the third slicer is associated with the pre-defined low threshold and the fourth slicer is associated with the pre-defined high threshold.

In some embodiments, the third slicer is a slicer circuit configured to sample the waveform to determine whether an amplitude at a sampling time is smaller than the pre-defined low threshold or not. Similarly, in some embodiments, the fourth slicer is a slicer circuit that is configured to sample the waveform to determine whether an amplitude at a sampling time is larger than the pre-defined high threshold or not.

In some embodiments, one or more amplitude values associated with each of the pre-defined high threshold, the pre-defined low threshold, the upper threshold, and the lower threshold. Each of the one or more amplitude values associated with each of the pre-defined high threshold, the pre-defined low threshold, the upper threshold, and the lower threshold may be associated with (e.g., may correspond to a threshold used for determining) a symbol value. In some embodiments, the transition status is determined to be the no transition in an instance in which the transition status is not the upward transition or the downward transition. It should be appreciated that more thresholds (that may be each associated with an additional slicer embedded within the phase detector) may be used to determine the transition status.

In some embodiments, a symbol value associated with the amplitude value associated with the pre-defined low threshold is of one of 0, 1, or 2, the amplitude value associated with the lower threshold is associated with a symbol value of one of 0, 1, or 2, a symbol value associated with the amplitude value associated with the pre-defined high threshold is one of 1, 2, or 3, and a symbol value associated with the amplitude value associated with the upper threshold is one of 1, 2, or 3.

In some embodiments, at optional operation 212, the phase detector is configured to update sampling phase based on the transition status and optionally the amplitude of the current symbol(n) relative to a threshold $T_0$ (by way of example, horizontal line 310 in FIG. 3). In some embodiments, the updated sampling phase may be utilized as an input to a control loop for processing the incoming waveform. In some embodiments, the updated sampling phase may be used directly. In some embodiments, the phase detector is configured to update the sampling phase by incrementing the sampling phase by a step defined by a pre-defined number of unit intervals in an instance in which the transition status is upward transition, by decrementing the sampling phase by the step defined by the pre-defined number of unit intervals in an instance in which the transition status is downward transition, and by making no adjustment in an instance in which the transition status is the no transition. It should be appreciated that in some embodiments, the phase detector is configured to update the sampling phase by outputting a phase error based on the transition status to a control loop for sampling phase adjustment and the control loop may further process the updated sampling phase for usage of a data sampler accordingly.

In some embodiments, the phase detector may be configured to determine, in an instance in which the transition status is not no transition, whether a phase detection associated with the current sampling time is early or late by using a fifth slicer to determine whether the amplitude associated with the current sampling time is larger than a threshold $T_0$. The fifth slicer may be associated with the threshold $T_0$. In some embodiments, the phase detection associated with the current sampling time is determined to be late if the amplitude associated with the current sampling time is larger than a threshold $T_0$ and the transition status is upward transition. In some embodiments, the phase detection associated with the current sampling time is determined to be early if the amplitude associated with the current sampling time is smaller than the threshold $T_0$ and the transition status is upward transition. In some embodiments, the phase detection associated with the current sampling time is determined to be early if the amplitude associated with the current sampling time is larger than the threshold $T_0$ and the transition status is downward transition. In some embodiments, the phase detection associated with the current sampling time is determined to be late if the amplitude associated with the current sampling time is smaller than the threshold $T_0$ and the transition status is downward transition. In some embodiments, the first slicer, the second slicer, the third slicer, the fourth slicer, and the fifth slicer are virtual slicers used by the phase detector.

In some embodiments, the threshold $T_0$ may be equal to the pre-defined high threshold $T_U$ and the pre-defined low threshold $T_L$. In such embodiments where the threshold $T_0$ is equal to the pre-defined high threshold $T_U$ and the pre-defined low threshold $T_L$, one single slicer associated with the threshold $T_0$ may serve as the third, fourth, and the fifth slicer.

As a particular example, in some embodiments, for a PAM-4 signal, values of the one or more symbols may be represented by one of 0, 1, 2, and 3. The transition status is determined to be the upward transition if a symbol value represented by the amplitude range of the immediately preceding sampling time is 0, a symbol value represented by the amplitude range of the current sampling time is 2, and a symbol value represented by the amplitude range of the immediately subsequent sampling time is 3. The transition status is determined to be the downward transition if the symbol value represented by the amplitude range of the immediately preceding sampling time is 3, the symbol value represented by the amplitude range of the current sampling time is 2, and the symbol value represented by the amplitude range of the immediately subsequent sampling time is 0. The algorithm for a phase control loop of these embodiments may be outlined as (one iteration):

```
up = dwn = 0                    % Reset counters
  for each sampling time, n
```

-continued

```
    if symbol(n)==2                                    % Selective PD
        if symbol(n-1)==0 AND symbol(n+1)==3           % Transition
            up if (amplitude(symbol(n))>dLev(2)) dwn += 1
            else                                       up += 1
        else if symbol(n-1)==3 AND symbol(n+1)==0      % Transition
            down if (amplitude(symbol(n))>dLev(2)) up += 1
            else                                       dwn += 1
        else
            ;                                          % No transition
        end
    end
end
phase_error+= up-dwn % Phase detector output to other control
loop in some embodiments.
sampling_phase += step*sign(up-dwn)         % Optional update
phase, could be performed by the phase detector in some embodiments.
```

In some embodiments, the transition status is determined to be the upward transition in an instance in which the amplitude range of the immediately preceding sampling time is smaller than a pre-defined low threshold $T_L$ and the amplitude range of the immediately subsequent sampling time is larger than the pre-defined high threshold $T_U$ ($s(n-1)<T_L$ AND $s(n+1)>T_U$). The transition status is determined to be the downward transition in an instance in which the amplitude value of the immediately subsequent sampling time is smaller than a pre-defined low threshold and the amplitude value of the immediately preceding sampling time is larger than the pre-defined high threshold ($s(n-1)>T_U$ AND $s(n+1)<T_L$). Another example way to describe the behavior of some embodiments of the phase detector in code is provided below:

slct(n):=$s(n)>S_L$ AND $s(n)<S_U$
trnu(n):=$s(n-1)<T_L$ AND $s(n+1)>T_U$
trnd(n):=$s(n-1)>T_U$ AND $s(n+1)<T_L$
evnt(n):=slct(n) AND (trnu(n) OR trnd(n))
err(n):=$s(n)>T_0$
up(n):=evnt(n) AND (err(n) XOR trnd(n))
dwn(n):=evnt(n) AND (err(n) XOR trnu(n))

In some embodiments, the phase detector is configured to update the sampling phase by incrementing the sampling phase by a step defined by a pre-defined number of unit intervals (such as 0.5 UI) in an instance in which the transition status is upward transition, decrementing the sampling phase by the step defined by the pre-defined number of unit intervals (such as 0.5 UI) in an instance in which the transition status is downward transition, and making no adjustment in an instance in which the transition status is the no transition. In some embodiments, the update of the sampling phase is equal to the sign of the amplitude value of the current sampling time minus a pre-defined threshold $T_0$ and the determined transition status.

In some embodiments, the lower threshold of the amplitude range for the amplitude value of the current sampling time Si is equal to the pre-defined low threshold $T_L$ and the upper threshold of the amplitude range for the amplitude value of the current sampling time $S_U$ is equal to the pre-defined high threshold $T_U$. In some embodiments, the lower threshold of the amplitude range for the amplitude value of the current sampling time $S_L$ is not equal to the pre-defined low threshold $T_L$ and the upper threshold of the amplitude range for the amplitude value of the current sampling time $S_U$ is not equal to the pre-defined high threshold $T_U$.

In some embodiments, for a PAM-4 incoming signal, if sLev(1) denotes the slicing level between symbol=0 and symbol=1, sLev(2) the slicing level between symbol=1 and symbol=2, and sLev(3) the slicing level between symbol=2 and symbol=3, then the various thresholds may be defined to be:
$S_L$=sLev(2)
$S_U$=sLev(3)
$T_L$=sLev(1)
$T_U$=sLev(3)
$T_0$=dLev(2)

In some other embodiments, the various thresholds may be defined to be:
$S_L$=sLev(2)
$S_U$=sLev(3)
$T_L$=dLev(2)
$T_U$=dLev(2)
$T_0$=dLev(2)

As such, more symbol sequences are defined to be associated with an upward or downward transition in these embodiments.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A full-rate phase detector for a pulse amplitude modulation signal, the phase detector configured to:
receive an incoming signal encoding one or more symbols in one or more amplitude values;
sample the incoming signal in one or more sampling times;
for each sampling time of the one or more sampling times:
determine that an amplitude associated with a current sampling time is within an upper threshold and a lower threshold;
upon determining that the amplitude of the current sampling time is within the upper threshold and the lower threshold, determine an amplitude range associated with an immediately preceding sampling time and an amplitude range associated with an immediately subsequent sampling time;
based on the amplitude range of the immediately preceding sampling time and the amplitude range of the immediately subsequent sampling time, determine a transition status representing one of an upward transition, a downward transition, or no transition with respect to the current sampling time; and
update a sampling phase based on the transition status.

2. The phase detector of claim 1, wherein the phase detector is configured to receive the incoming signal encoding the one or more symbols in four or more amplitude values.

3. The phase detector of claim 1, wherein the phase detector is configured to determine that the amplitude range associated with the current sampling time is within the upper threshold and the lower threshold by using a first slicer associated with the upper threshold and a second slicer associated with the lower threshold, and wherein the first slicer and the second slicer are embedded within the phase detector.

4. The phase detector of claim 1, wherein the transition status is determined to be the upward transition in an instance in which the amplitude range of the immediately preceding sampling time is smaller than a pre-defined low threshold and the amplitude range of the immediately subsequent sampling time is larger than a pre-defined high threshold, and wherein the transition status is determined to be the downward transition in an instance in which the amplitude range of the immediately subsequent sampling time is smaller than the pre-defined low threshold and the amplitude range of the immediately preceding sampling time is larger than the pre-defined high threshold.

5. The phase detector of claim 4, wherein the amplitude range associated with the immediately preceding sampling time and the amplitude range associated with the immediately subsequent sampling time are determined by using a third slicer and a fourth slicer embedded within the phase detector, and wherein the third slicer is associated with the pre-defined low threshold and the fourth slicer is associated with the pre-defined high threshold.

6. The phase detector of claim 1, wherein the transition status is determined to be the no transition in an instance in which the transition status is not the upward transition or the downward transition.

7. The phase detector of claim 1, wherein the phase detector is configured to update the sampling phase by incrementing the sampling phase by a step defined by a pre-defined number of unit intervals in an instance in which the transition status is upward transition, by decrementing the sampling phase by the step defined by the pre-defined number of unit intervals in an instance in which the transition status is downward transition, and by making no adjustment in an instance in which the transition status is the no transition.

8. The phase detector of claim 4, wherein one or more amplitude values associated with each of the pre-defined high threshold, the pre-defined low threshold, the upper threshold, and the lower threshold is associated with a symbol value.

9. The phase detector of claim 8, wherein a first symbol value associated with a first amplitude value associated with the pre-defined low threshold is one of 0, 1, or 2, wherein a second amplitude value associated with the lower threshold is associated with a second symbol value of one of 0, 1, or 2, wherein a third symbol value associated with a third amplitude value associated with the pre-defined high threshold is one of 1, 2, or 3, and wherein a fourth symbol value associated with a fourth amplitude value associated with the upper threshold is one of 1, 2, or 3.

10. The phase detector of claim 1, wherein the phase detector configured to determine, in an instance in which the transition status is not the no transition, whether a phase detection associated with the current sampling time is early or late by using a fifth slicer to determine whether the amplitude associated with the current sampling time is larger than a threshold $T_0$.

11. A method for phase detection in a full-rate phase detector for a pulse amplitude modulation signal, the method comprising:

receiving an incoming signal encoding one or more symbols in one or more amplitude values;

sampling the incoming signal in one or more sampling times;

for each sampling time of the one or more sampling times:

determining that an amplitude associated with a current sampling time is within an upper threshold and a lower threshold;

upon determining that the amplitude of the current sampling time is within the upper threshold and the lower threshold, determining an amplitude range associated with an immediately preceding sampling time and an amplitude range associated with an immediately subsequent sampling time;

based on the amplitude range of the immediately preceding sampling time and the amplitude range of the immediately subsequent sampling time, determining a transition status representing one of an upward transition, a downward transition, or no transition with respect to the current sampling time; and updating a sampling phase based on the transition status.

12. The method of claim 11, wherein receiving the incoming signal comprises receiving the incoming signal encoding the one or more symbols in four or more amplitude values.

13. The method of claim 11, wherein determining that the amplitude range associated with the current sampling time is within the upper threshold and the lower threshold comprises using a first slicer associated with the upper threshold and a second slicer associated with the lower threshold, and wherein the first slicer and the second slicer are embedded within the phase detector.

14. The method of claim 11, wherein the transition status is determined to be the upward transition in an instance in which the amplitude range of the immediately preceding sampling time is smaller than a pre-defined low threshold and the amplitude range of the immediately subsequent sampling time is larger than a pre-defined high threshold, and wherein the transition status is determined to be the downward transition in an instance in which the amplitude range of the immediately subsequent sampling time is smaller than the pre-defined low threshold and the amplitude range of the immediately preceding sampling time is larger than the pre-defined high threshold.

15. The method of claim 14, wherein the amplitude range associated with the immediately preceding sampling time and the amplitude range associated with the immediately subsequent sampling time are determined by using a third slicer and a fourth slicer embedded within the phase detector, and wherein the third slicer is associated with the pre-defined low threshold and the fourth slicer is associated with the pre-defined high threshold.

16. The method of claim 11, wherein the transition status is determined to be the no transition in an instance in which the transition status is not the upward transition or the downward transition.

17. The method of claim 11, wherein updating the sampling phase comprises incrementing the sampling phase by a step defined by a pre-defined number of unit intervals in an instance in which the transition status is upward transition, decrementing the sampling phase by the step defined by the pre-defined number of unit intervals in an instance in which the transition status is downward transition, and making no adjustment in an instance in which the transition status is the no transition.

18. The method of claim 14, wherein one or more amplitude values associated with each of the pre-defined high threshold, the pre-defined low threshold, the upper threshold, and the lower threshold is associated with a symbol value.

19. The method of claim 18, wherein a first symbol value associated with a first amplitude value associated with the pre-defined low threshold is one of 0, 1, or 2, wherein a second amplitude value associated with the lower threshold is associated with a second symbol value of one of 0, 1, or 2, wherein a third symbol value associated with a third amplitude value associated with the pre-defined high threshold is one of 1, 2, or 3, and wherein a fourth symbol value associated with a fourth amplitude value associated with the upper threshold is one of 1, 2, or 3.

20. The method of claim 11, further comprising determining, in an instance in which the transition status is not the no transition, whether a phase detection associated with the current sampling time is early or late by using a fifth slicer to determine whether the amplitude associated with the current sampling time is larger than a threshold $T_0$.

* * * * *